United States Patent
Du et al.

(10) Patent No.: US 8,891,962 B2
(45) Date of Patent: Nov. 18, 2014

(54) OPTICAL SWITCHING APPARATUS AND METHOD FOR AN ENB

(75) Inventors: Jianhua Du, Shenzhen (CN); Chunsheng Li, Shenzhen (CN); Youbai Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 695 days.

(21) Appl. No.: 13/142,361

(22) PCT Filed: Oct. 10, 2009

(86) PCT No.: PCT/CN2009/074393
§ 371 (c)(1),
(2), (4) Date: Jun. 27, 2011

(87) PCT Pub. No.: WO2010/072098
PCT Pub. Date: Jul. 1, 2010

(65) Prior Publication Data
US 2011/0268440 A1 Nov. 3, 2011

(30) Foreign Application Priority Data

Dec. 26, 2008 (CN) .......................... 2008 1 0241597

(51) Int. Cl.
*H04J 14/00* (2006.01)
*H04B 10/00* (2013.01)
*H04Q 11/00* (2006.01)
*H04W 8/26* (2009.01)
*H04W 88/08* (2009.01)

(52) U.S. Cl.
CPC ............. *H04Q 11/0005* (2013.01); *H04W 8/26* (2013.01); *H04W 88/08* (2013.01); *H04Q 2011/0035* (2013.01); *H04Q 2011/0073* (2013.01)
USPC ........................................... 398/45; 398/116

(58) Field of Classification Search
CPC .............. H04Q 11/023; H04Q 11/026; H04Q 2011/0064; H04Q 2011/0073
See application file for complete search history.

(56) References Cited

U.S. PATENT DOCUMENTS

| 6,999,460 | B1 * | 2/2006 | Fiore .............................. 370/400 |
| 7,177,544 | B1 | 2/2007 | Wada et al. | |
| 2004/0096222 | A1 * | 5/2004 | Cagenius ....................... 398/115 |

(Continued)

FOREIGN PATENT DOCUMENTS

| CN | 1832593 A | 9/2006 |
| CN | 1996810 A | 7/2007 |

(Continued)

*Primary Examiner* — David Payne
*Assistant Examiner* — Casey Kretzer
(74) *Attorney, Agent, or Firm* — McGarry Bair PC

(57) ABSTRACT

The present invention provides an optical switching apparatus and method of an eNB. The above apparatus includes: a fiber transceiver module (102), configured to receive an optical signal which carries transmission address information from the source input end (101) and transmit the optical signal; a transmission address module (103), configured to receive the above optical signal, query routing, and manage and maintain transmission address(es); a switching control module (104), configured to obtain the transmission address information of the optical signal, analyze and select an optical switching mode, and transmit a routing control signal which carries the transmission address information and the optical switching mode; and an optical switching and routing module (105), configured to receive the above optical signal and transmit the same to a destination output end (106) by the fiber transceiver module (102), receive the routing control signal of the switching control module (104), select a routing and transmit the optical signal to the destination output end (106). According to the present invention, the RRU and the BBU of the eNB can communicate with devices of the BBU and the RRU of the different manufacturers, can be applied to the multi-mode base station, and can adapt to the different mode; therefore the transmission distance is enlarged.

12 Claims, 3 Drawing Sheets

(56) References Cited

U.S. PATENT DOCUMENTS

| | | | |
|---|---|---|---|
| 2004/0133610 A1* | 7/2004 | Flam et al. | 707/200 |
| 2005/0111474 A1* | 5/2005 | Kobayashi | 370/432 |
| 2007/0014233 A1* | 1/2007 | Oguro et al. | 370/216 |
| 2009/0041029 A1* | 2/2009 | Dropps et al. | 370/395.62 |

FOREIGN PATENT DOCUMENTS

| | | |
|---|---|---|
| CN | 101155120 A | 4/2008 |
| JP | 2004222012 A | 8/2004 |
| RU | 77527 U1 | 10/2008 |
| WO | 2008055169 A2 | 5/2008 |

* cited by examiner

OPTICAL SWITCHING APPARATUS AND METHOD FOR AN ENB

CROSS-REFERENCE TO RELATED APPLICATIONS

This application is a National Phase application of International Application No. PCT/CN2009/074393 filed on Oct. 10, 2009, which claims the benefit of Chinese Patent Application No. 200810241597.3, filed Dec. 26, 2008, both of which are incorporated herein by reference in their entirety.

FIELD OF THE INVENTION

The present invention relates to the data communication field, and particularly to an optical switching apparatus and method for an eNB (E-UTRAN Node B).

BACKGROUND OF THE INVENTION

The optical communication connection mode between a BBU (Base Band Unit) and a RRU (Remote Radio Unit) of a current eNB is mainly a direct connection mode, whose connection number mainly depends on the optical interfaces provided by the RRU and the BBU. With the development and application of optical technology and optical switching network, the diversification of communication modes between the BBU and the RRU of the eNB is being realized instead of the single direct connection mode, i.e., the BBU and the RRU of the eNB use an optical network for communication, which is one of relatively popular hot topics in the communication field. The optical communication connection mode between the BBU and the RRU of the eNB is the direct connection mode, which has the following shortcomings:

1. The communication connection mode lacks diversification, and networking is single. Since the optical communication connection mode between the BBU and the RRU of the current eNB is mainly the direct connection mode, the networking thereof is limited especially in a region whose physical terrain is complicated, which further affects the application thereof.

2. The optical communication links between the BBU and the RRU of the eNB are limited. The optical communication links between the BBU and the RRU of the current eNB are mainly based on the optical interfaces provided by the RRU and the BBU, and therefore the connection number is limited.

3. Transmission distance is limited. The transmission distance between the BBU and the RRU of the eNB in the direct connection mode is merely M km (wherein M>0), and can not be enlarged to a distance such as [M, 2M] or even longer.

SUMMARY OF THE INVENTION

The object of the present invention is to overcome the shortcomings of the prior art, thus an optical switching apparatus and method is provided for an eNB. The present invention realizes a separate communication, a multiple-to-multiple communication and a flexible networking between a RRU and a BBU by making the network topology structure of the BBU and the RRU of the eNB turn to a switching network from a direct connection network.

In order to solve the above problem, the present invention is realized by the following technical solutions:

An optical switching apparatus of an eNB is first provided according to one aspect of the present invention.

The optical switching apparatus of the eNB according to the present invention comprises: a source input end, a destination output end and an optical switching module, wherein the optical switching module comprises a fiber transceiver module, a transmission address module, a switching control module and an optical switching and routing module, wherein, the fiber transceiver module is configured to receive an optical signal which carries transmission address information from the source input end and to transmit the optical signal;

the transmission address module is configured to receive the optical signal transmitted by the fiber transceiver module, to query routing, and to manage and maintain transmission address(s);

the switching control module, connected with the transmission address module, is configured to obtain the transmission address information of the optical signal, to analyze and select an optical switching mode, and to transmit a routing control signal which carries the transmission address information and the optical switching mode; and the optical switching and routing module is configured to receive the optical signal of the transmission address module and to transmit the same to the destination output end by the fiber transceiver module, to receive the routing control signal of the switching control module, to select routing according to the route control signal and to transmit the optical signal to the destination output end via the fiber transceiver module.

The above fiber transceiver module comprises optical interfaces, and the number of the optical interfaces is greater than or equal to 2.

The above source input port and objective output port may be respectively a RRU or a BBU, and may also be products from different manufactures.

The above transmission address module comprises a transmission address routing learning table which comprises an Internet address, a physical address, a preceding hop routing, a next hop routing, and a routing type, and is used to query and update the transmission address information of the optical signal.

The above switching control module comprises a routing snapshot table which is used to save routing information of last N times of communication, wherein N is a natural number; and the routing information comprises information such as a source node, a destination node, achievable or not, communication of a same network element or not, and the used optical switching mode.

An optical switching method of an eNB is also provided according to another aspect of the present invention.

The optical switching method of the eNB according to the present invention specifically comprises the following steps (Steps 1-4):

Step 1, a source input end transmitting an optical signal which carries transmission address information to a fiber transceiver module, the fiber transceiver module transmitting the optical signal to a transmission address module;

Step 2, the transmission address module querying a transmission address routing learning table thereof, wherein if the query succeeds, the transmission address module transmits the optical signal to the fiber transceiver module via an optical switching and routing module, and if the query fails, the transmission address module transmits the optical signal to the optical switching and routing module for buffering, and transmits the transmission address information of the optical signal to a switching control module at the same time; and then the process goes to Step 3;

Step 3, the switching control module acquiring the transmission address information of the optical signal, selecting an optical switching and routing mode, and then transmitting the routing control signal which carries the transmission address information and the optical switching mode to the optical switching and routing module; and Step 4, the optical switching and routing module selecting a routing according to the routing control signal, wherein if routing selection succeeds, the buffered optical signal is transmitted to the destination output end via the fiber transceiver module; and if the routing selection fails, routing selection information after the failure is returned to the switching control module.

In the above Step 1, the transmission address information comprises a source address and a destination address.

In the above Step 3, after the optical signal which carries the transmission address information is received, the switching control module updates a routing snapshot table thereof and confirms whether it is communication in a same node or between different nodes, then reads out the updated routing snapshot table, and transmits the routing control signal which carries the transmission address information and the optical switching mode to the optical switching and routing module.

The above optical switching mode may be a thermo-optical switching or a liquid crystal switching.

In the above Step 4, after the routing selection succeeds, the optical switching and routing module returns the routing selection information after the success to the switching control module.

In the above Step 4, after the routing selection information returned by the optical switching and routing module is received, the switching control module updates the routing snapshot table thereof and transmits the routing selection information to the transmission address module; and the transmission address module updates the transmission address routing learning table thereof according to the routing selection information.

In summary, according to the optical switching apparatus and method of the eNB of the present invention, the network topology structure between the BBU and the RRU of the eNB can be changed from the direct connection network to the switching network, and it not only realizes the separate communication, the multiple-to-multiple communication and a flexible networking, but also makes the BBU and the RRU of the eNB communicate with the devices of the RRUs and BBUs of different manufacturers. Specifically, the apparatus and the method can be applied to the multi-mode base station; the BBU and the RRU can adapt to the different modes; and the transmission distance is enabled to be enlarged.

Other features and advantages of the present invention will be described in the following description and partly become obvious from the description, or be understood by implementing the present invention. The objects and other advantages of the present invention can be realized and obtained through the structures indicated by the description, claims and drawings.

BRIEF DESCRIPTION OF THE DRAWINGS

The drawings are used to provide a further understanding of the present invention and form a part of the specification, which are used to explain the present invention in combination of the embodiments of the present invention without unduly limiting the present invention, wherein.

DETAILED DESCRIPTION OF THE EMBODIMENTS

Function Overview

In the embodiments of the present invention, by an optical switching apparatus and method of the eNB, the network topology structure between a BBU and a RRU of an eNB can be changed from a direct connection network to a switching network; the networking can be flexible; a separate communication and a multiple-to-multiple communication are realized; the BBU and the RRU of the eNB can communicate with device(s) of the RRU and the BBU of a different manufacturer; and specifically, the apparatus and the method can be applied to a multi-mode base station, wherein the BBU and the RRU can adapt to different modes and the transmission distance is enlarged.

The present invention will be further described in connection with the drawings and the embodiments in order to understand the present invention better.

The embodiments of the application and the features thereof can be combined with each other if there is no conflict.

Figure 1:
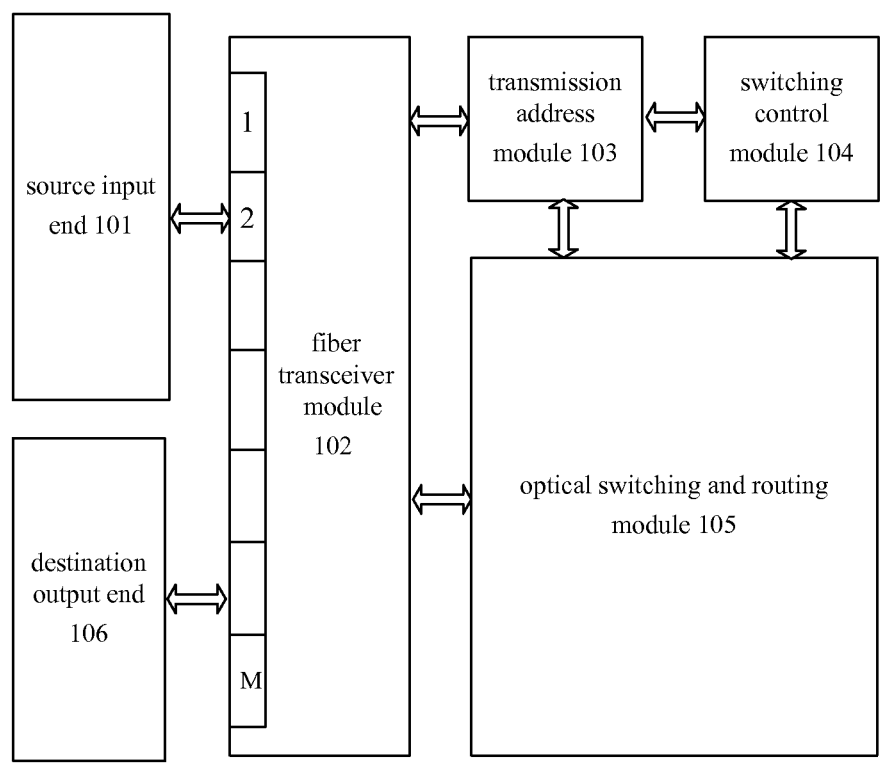
FIG. 1 is a schematic diagram of an apparatus provided by the embodiments of the present invention.

As shown in FIG. 1, when a source input end communicates with a destination output end, first, if the source input end 101 has an optical signal which carries transmission address information and is to be transmitted, the source input end 101 transmits the optical signal to a fiber transceiver module 102 of an optical switching module.

The fiber transceiver module 102 transmits the optical signal to a transmission address module 103.

The transmission address module 103 reads out the transmission address information from the received optical signal and queries a transmission address routing learning table.

If the query succeeds, the optical signal is transmitted to the destination output end 106 via an optical switching and routing module 105 according to an optical interface provided by the actual fiber transceiver module 1 corresponding to the destination output port provided by the result of the query.

If the query fails, the transmission address information is transmitted to a switching control module 104, at the same time, the received optical signal from the source input end is transmitted to the optical switching and routing module 105; and after the transmission address information is received, the switching control module 104 analyzes and selects an optical switching mode, and then transmits a routing control signal which carries the transmission address information and the optical switching mode to the optical switching and routing module 105.

The signal received by the optical switching and routing module 105 comprises two paths, one of which comes from the transmission address module 103 and is mainly transmitted to an output interface; and the other path comes from the routing control signal of the switching control module 104 and mainly provides the selection of the optical switching mode and the selection of routing.

After the optical signal from the transmission address module 103 is received, the optical switching and routing module 105 buffers the same and transmits the same to the destination output end 106 after the selections succeed.

After the routing control signal from the switching control module 104 is received, the optical switching and routing module 105 performs the routing according to the routing control signal and selects the destination output interface: 1) if routing selection succeeds, the optical signal buffered in advance is read out and transmitted to the destination output end 106; 2) if the routing selection fails, failure routing selection information is fed back to the switching control module 104; the switching control module 104 updates its routing snapshot table according to the failure routing selection information, and transmits routing selection information to the transmission address module 103 at the same time; and the transmission address module 103 updates its transmission address routing learning table according to the routing selection information. When the routing selection succeeds, the optical switching and routing module 105 may return the routing selection information after the success to the switching control module 104.

The source input end 101 and the destination output end 106 may be a RRU or a BBU respectively, and may also be products from different manufacturers; and the transmission address information comprises a source address and a destination address.

The fiber transceiver module 102 comprises 2 or more optical interfaces.

The transmission address module 103 contains the transmission address routing learning table, wherein the transmission address routing learning table comprises an Internet address, a physical address, a preceding hop routing, a next hop routing, and a routing type, and is used to query and update the address information of the optical signal.

The switching control module 104 contains the routing snapshot table; the routing snapshot table is used to save the routing information of the last N times of the communication, wherein N is a natural number; the routing information comprises information such as a source node, a destination node, achievable or not, communication of a same network element or not, and the used optical switching mode; and the routing selection information may comprise information such as the reason that the routing selection succeeds/fails, a routing path, the source address, and the destination address.

During an actual implementation procedure, after the transmission address information is received, the switching control module 104, on one hand, updates its routing snapshot table; on the other hand, confirms whether the communication is carried out in a same node or between different nodes according to the transmission address information, then reads out the updated routing snapshot table, and transmits the routing control signal which carries the transmission address information and the optical switching mode to the optical switching and routing module 105. The optical switching mode may be a thermo-optical switching or a liquid crystal switching; the switching control module 104 may update the routing snapshot table according to the routing selection information, and then feedback the same to the transmission address module 103; and the transmission address module 103 updates the transmission address routing learning table thereof again, so as to keep the consistency between the routing snapshot table and the transmission address routing learning table. After the destination output end 106 receives the optical signal from the source input end 101, the process is same as that of the current eNB.

Figure 2:
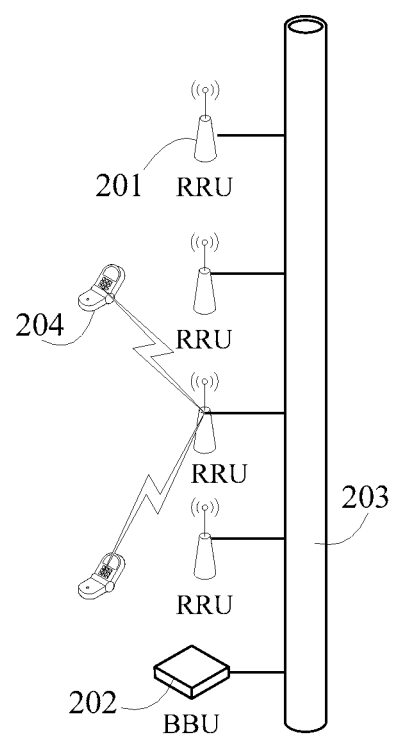
FIG. 2 is a schematic diagram of the network topology structure according to the present invention.

As shown in FIG. 2, the schematic diagram of the network topology structure of the present invention relates to a plurality of RRUs and one BBU; first, after a radio signal is received from an MS (mobile station), a RRU 201 transmits the same to the optical switching module 203 of the present invention, then a selection of routing is performed to determine a destination output end of a BBU 202. After the BBU 202 receives a baseband signal from a core network, the process is same as that of the uplink direction.

Figure 3:
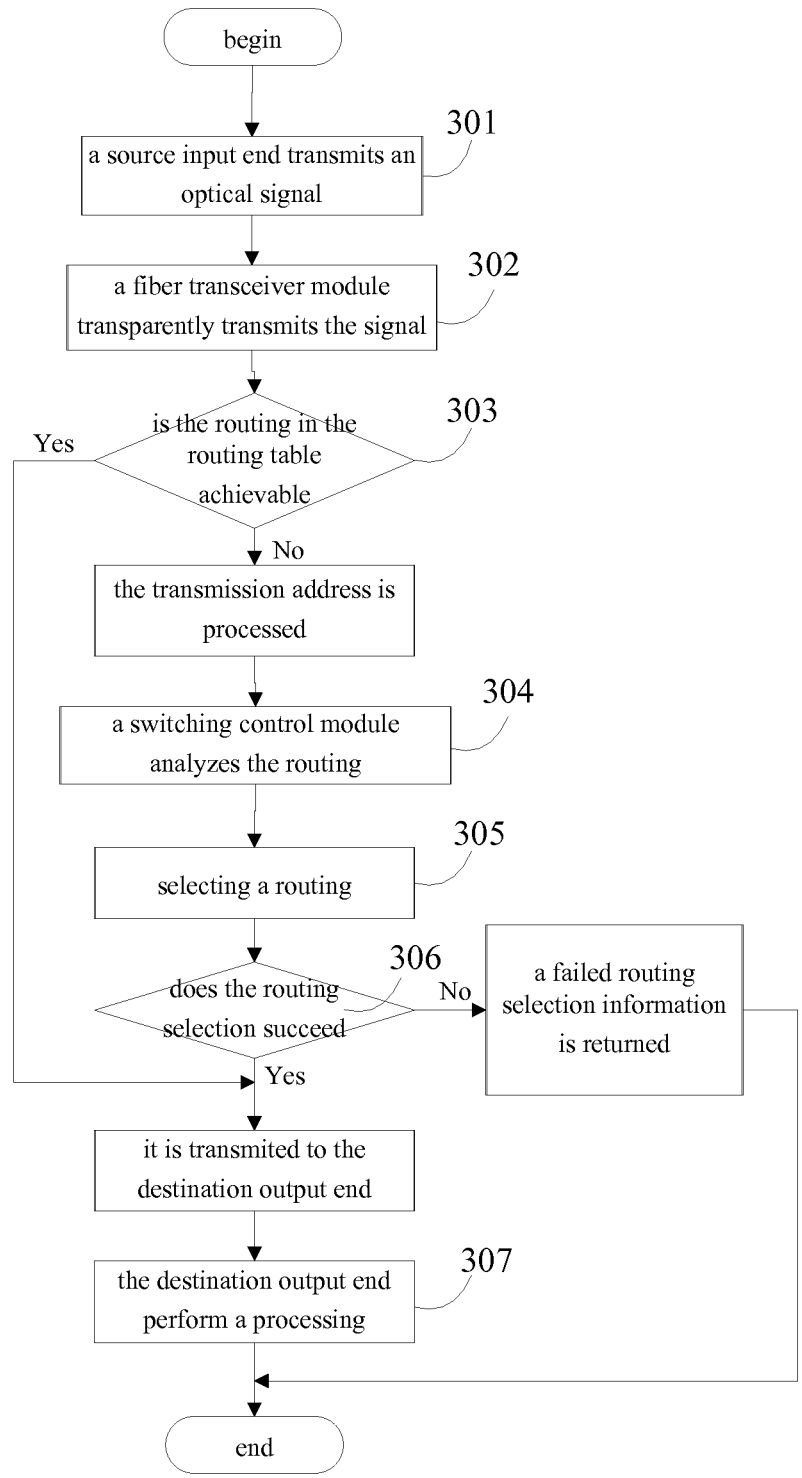
FIG. 3 is a flow chart of a method provided by the embodiments of the present invention.

As shown in FIG. 3, the specific steps for implementing the above method of the embodiments of the present invention are described as follows (Steps 301-307).

Step 301, if a source input end has an optical signal to be transmitted to a destination output end, the source input end transmits the optical signal to a fiber transceiver module first.

Step 302, the fiber transceiver module is responsible to receive/transmit the optical signal, and deliver the optical signal from the source input end to a transmission address module in the uplink direction; and the fiber transceiver module provides optical interfaces for external, wherein the number of the optical interfaces determines communication capacity between a RRU and a BBU, and the number of the optical interfaces M is greater than or equal to 2, wherein when M=2, one-to-one communication is realized between the RRU and the BBU; and when M>2, one-to-multiple, multiple-to-one or multiple-to-multiple communication may be realized between the RRU and the BBU. For example, when M=6, one optical interface is assigned to the RRU, and the other 5 optical interfaces are assigned to the BBU, 1-to-5 communication is realized between the RRU and the BBU; if 5 optical interfaces are assigned to the RRU, and the rest one is assigned to the BBU, 5-to-1 communication is realized between the RRU and the BBU; and if 3 optical interfaces are assigned to the RRU, and the other 3 optical interfaces are assigned to the BBU, 3-to-3 communication is realized between the RRU and the BBU. In a word, the optical interfaces can be arbitrarily assigned, and any one of which is different from the communication of the traditional direct connection mode and belongs to the switching communication.

Step 303, the transmission address module receives the optical signal from the fiber transceiver module, extracts transmission address information in the optical signal, and queries a transmission address routing learning table according to the transmission address information, wherein if the query fails, the transmission address module will transmit the transmission address information to a switching control module, at the same time, transmit the optical signal to an optical switching and routing module for buffering; and if the query succeeds, the transmission address module will directly read out the destination output end from the transmission routing learning table and transmit the optical signal to the destination output end, and then the process goes to Step 306.

Step 304, if the information received by the switching control module is the transmission address information transmitted by the transmission address module, it shows that the source node and the destination node communicate with each other for the first time, or the previous times of communication fail. The switching control module, on one hand, updates its routing snapshot table, and on the other hand, confirms whether the communication is carried out in a same node (RRU) or between different nodes (RRU and BBU), reads out the updated routing snapshot table, and transmits a routing control signal which carries the transmission address information and an optical switching mode to the optical switching and routing module.

Step 305, if the signal received by the optical switching and routing module is the optical signal transmitted by the source input end, optical signal is buffered first; and if the signal received by the optical switching and routing module is the routing control signal transmitted by the switching control module, a selection of routing is performed according to the routing control information. If routing selection succeeds, the optical signal buffered in advance is read out and transmitted to the destination output end, and routing selection information after the success is returned to the switching control module. If the routing selection fails, the routing selection information after the failure is returned to the switching control module. If the signal received by the switching control module is the routing selection information returned by the optical switching and routing module, the routing snapshot table is updated and the routing selection information is transmitted to the transmission address module, and the transmission address module updates the transmission address routing learning table.

Step 306, if the transmission address module queries routing successfully or the optical switching and routing module queries the routing successfully, the optical signal of the source input end is transmitted to the destination output end via the fiber transceiver module.

Step 307, the destination output end receives the optical signal from the source input end, and the process is same as that of a current eNB.

The process of downlink direction is same as that of the uplink direction. The present invention enables the network topology structure between the BBU and the RRU of the eNB to change from the direct connection network to the switching network, and it not only realizes the separate communication, the multiple-to-multiple communication and a flexible networking, but also makes the BBU and the RRU of the eNB communicate with the devices of the RRUs and BBUs of different manufacturers, and enables the transmission distance to be enlarged.

To sum up, by the optical switching apparatus and method of the eNB of embodiments of the present invention, the network topology structure between the BBU and the RRU of the eNB can be changed from the direct connection network to the switching network, and it not only realizes the separate communication, the multiple-to-multiple communication and a flexible networking, but also makes the BBU and the RRU of the eNB communicate with the devices of the RRUs and BBUs of different manufacturers. Specifically, the apparatus and the method can be applied to the multi-mode base station; the BBU and the RRU can adapt to the different modes; and the transmission distance is enabled to be enlarged.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. An optical switching apparatus of an E-UTRAN Node B (eNB), comprising: a source input end and a destination output end, wherein the apparatus further comprises an optical switching module, wherein the optical switching module comprises a fiber transceiver module, a transmission address module, a switching control module and an optical switching and routing module, wherein the fiber transceiver module is configured to receive an optical signal which carries transmission address information from the source input end and to transmit the optical signal;

the transmission address module is configured to receive the optical signal transmitted by the fiber transceiver module, to query routing, and to manage and maintain transmission address(s);

the switching control module, connected with the transmission address module, is configured to obtain the transmission address information of the optical signal, to analyze and select an optical switching mode, and to transmit a routing control signal which carries the transmission address information and the optical switching mode; and the optical switching and routing module is configured to receive the optical signal of the transmission address module and to transmit the same to the destination output end by the fiber transceiver module, to receive the routing control signal of the switching control module, to select routing according to the route control signal and to transmit the optical signal to the destination output end via the fiber transceiver module;

wherein after the routing selection succeeds, the optical switching and routing module is configured to return the routing selection information after the success to the switching control module;

wherein after receiving the routing selection information returned by the optical switching and routing module, the switching control module is configured to update a routing snapshot table thereof and transmit the routing selection information to the transmission address module;

and the transmission address module is configured to update a transmission address routing learning table thereof according to the routing selection information.

2. The optical switching apparatus of the eNB according to claim 1, wherein the fiber transceiver module comprises optical interfaces, and the number of the optical interfaces is greater than or equal to 2.

3. The optical switching apparatus of the eNB according to claim 1, wherein the source input end and the destination output end are respectively a Remote Radio Unit (RRU) or a Base Band Unit (BBU).

4. The optical switching apparatus of the eNB according to claim 1, wherein the transmission address module comprises the transmission address routing learning table which comprises an Internet address, a physical address, a preceding hop routing, a next hop routing, and a routing type, and is used to query and update the transmission address information of the optical signal.

5. The optical switching apparatus of the eNB according to claim 4, wherein the switching control module comprises the routing snapshot table which is used to save routing information of last N times of communication, wherein N is a natural number; and the routing information comprises a source node, a destination node, achievable or not, communication of a same network element or not, and the used optical switching mode.

6. An optical switching method of an E-UTRAN Node B (eNB), wherein the method comprises the following steps:

A, a source input end transmitting an optical signal which carries transmission address information to a fiber transceiver module, the fiber transceiver module transmitting the optical signal to a transmission address module;

B, the transmission address module querying a transmission address routing learning table thereof, wherein if the query succeeds, the transmission address module transmits the optical signal to the fiber transceiver module via an optical switching and routing module, and if the query fails, the transmission address module transmits the optical signal to the optical switching and routing module for buffering, and transmits the transmission address information of the optical signal to a switching control module at the same time; and then the process goes to Step C;

C, the switching control module acquiring the transmission address information of the optical signal, selecting an optical switching and routing mode, and then transmitting a routing control signal which carries the transmission address information and an optical switching mode to the optical switching and routing module; and D, the optical switching and routing module selecting a routing according to the routing control signal, wherein if routing selection succeeds, the buffered optical signal is transmitted to the destination output end via the fiber transceiver module; and if the routing selection fails, routing selection information after the failure is returned to the switching control module;

wherein in the Step D, after the routing selection succeeds, the optical switching and routing module returns the routing selection information after the success to the switching control module;

wherein in the Step D, after receiving the routing selection information returned by the optical switching and routing module, the switching control module updates a routing snapshot table thereof and transmits the routing selection information to the transmission address module; and the transmission address module updates the transmission address routing learning table thereof according to the routing selection information.

7. The optical switching method of the eNB according to claim 6, wherein in the Step A, the transmission address information comprises a source address and a destination address.

8. The optical switching method of the eNB according to claim 6, wherein in the Step C, after the optical signal which carries the transmission address information is received, the switching control module updates the routing snapshot table thereof and confirms whether it is communication in a same node or between different nodes, then reads out the updated routing snapshot table, and transmits the routing control signal which carries the transmission address information and the optical switching mode to the optical switching and routing module.

9. The optical switching apparatus of the eNB according to claim 2, wherein the transmission address module comprises the transmission address routing learning table which comprises an Internet address, a physical address, a preceding hop routing, a next hop routing, and a routing type, and is used to query and update the transmission address information of the optical signal.

10. The optical switching apparatus of the eNB according to claim 9, wherein the switching control module comprises the routing snapshot table which is used to save routing information of last N times of communication, wherein N is a natural number; and the routing information comprises a source node, a destination node, achievable or not, communication of a same network element or not, and the used optical switching mode.

11. The optical switching apparatus of the eNB according to claim 3, wherein the transmission address module comprises the transmission address routing learning table which comprises an Internet address, a physical address, a preceding hop routing, a next hop routing, and a routing type, and is used to query and update the transmission address information of the optical signal.

12. The optical switching apparatus of the eNB according to claim 11, wherein the switching control module comprises the routing snapshot table which is used to save routing information of last N times of communication, wherein N is a natural number; and the routing information comprises a source node, a destination node, achievable or not, communication of a same network element or not, and the used optical switching mode.

\* \* \* \* \*